United States Patent [19]

Bellew

[11] Patent Number: 4,484,193
[45] Date of Patent: Nov. 20, 1984

[54] RADAR APPARATUS FOR DETECTING AND/OR CLASSIFYING AN AGITATED REFLECTIVE TARGET WHEN RELATIVE TRANSLATION OBTAINS

[75] Inventor: Francis N. Bellew, South Plainfield, N.J.

[73] Assignee: Lockheed Electronics Corp., Plainfield, N.J.

[21] Appl. No.: 629,235

[22] Filed: Nov. 6, 1975

[51] Int. Cl.$^3$ .................. G01S 13/00; G01S 13/52; G01S 13/58

[52] U.S. Cl. .................. 343/5 SA; 343/5 PD; 343/6 R; 343/7 A; 343/7.7; 343/8

[58] Field of Search .............. 343/5 SA, 5 PD, 6 R, 343/7 A, 7.7, 8; 340/16 R

[56] References Cited

U.S. PATENT DOCUMENTS

| | | | |
|---|---|---|---|
| 3,176,294 | 3/1965 | Merlo et al. | 343/8 |
| 3,181,150 | 4/1965 | Ruppersberg et al. | 343/7 VC |
| 3,512,155 | 5/1970 | Bloice | 343/8 |
| 3,733,603 | 5/1973 | Johnston | 343/7.7 |
| 3,772,696 | 11/1973 | Kummer | 343/8 |
| 3,882,495 | 5/1975 | Bolger | 343/5 SA |

Primary Examiner—S. C. Buczinski
Attorney, Agent, or Firm—Hopgood, Calimafde, Kalil, Blaustein & Judlowe

[57] ABSTRACT

Improved non-cooperative radar apparatus locates and type-classifies an agitated, vibrating reflective target (e.g., a vehicle with its engine running) - whether the target is moving or stationary.

A receiver with a cooperating band pass filter extracts a reflected, frequency-shifted energy pattern from a frequency limited band exceeding the Doppler-shifted emitted interrogation wave to identify the incidence of the agitated target. In accordance with further aspects of the instant invention, the particular energy distribution for the returned, reflected wave is then compared with a stored ensemble of such distributions, or target "signatures", to type-catagorize the target.

14 Claims, 4 Drawing Figures

RADAR APPARATUS FOR DETECTING AND/OR CLASSIFYING AN AGITATED REFLECTIVE TARGET WHEN RELATIVE TRANSLATION OBTAINS

DISCLOSURE OF THE INVENTION

This invention relates to non-cooperative radar objectlocating surveillance systems and, more specifically, to novel radar apparatus for locating and type-characterizing a target formed of plural "agitated" components.

Prior art non-cooperative radar systems have operated in several modes to detect and locate a target. As a generality, such systems radiate pulsed or continuous energy, and identify a target by examining some property of the return signal reflected from the target, e.g., amplitude, frequency (for conventional Doppler systems generating a frequency change dependent upon the relative motion between the radar apparatus and target), or phase.

However, it has been found difficult with such prior art radar systems to (1) detect a stationary target in an object filled ("cluttered") environment—e.g., a stationary vehicle in a forest; or (2) to identify the type of target which is giving rise to a positive return signal.

It is an object of the present invention to provide improved radar apparatus.

More specifically, it is an object of the present invention to provide novel radar apparatus for detecting targets formed of plural vibrating components (e.g., a vehicle with its engine running)—even if the target is stationary, thus rendering a Doppler radar ineffective.

It is a further object of the present invention to provide radar apparatus which provides type-identification of an agitated or vibrating multipart reflective target.

Yet another object of the present invention is the provision of radar apparatus for locating agitated reflective objects when relative motion obtains between the target and radar equipment.

The above and other objects of the present invention are realized in specific, illustrative radar apparatus for locating and, if desired, identifying a target characterized by switching, or agitated reflective components. The non-cooperative target locating and identifying apparatus is operative upon the principle that such vibrating target structures produce a unique reflected energy pattern (herein: "signature") in modulation side bands of several Khz extent about the carrier frequency, e.g., about 2–5 Khz.

In accordance with the principles of the present invention, the agitated-target detecting radar equipment undergoes relative motion with respect to a target, e.g., for aircraft or missile mounted radar apparatus closing to a target. The received return signal disposed at a variable spectrum position depending upon the Doppler frequency translation, is then shifted to a fixed band limited spectrum by a heterodyne converter having automatic frequency control. A band pass filter tuned to this fixed band then extracts the target signature wave in a frequency band slightly displaced (in relative terms) from the Doppler-shifted radiated signal. Pursuant to varying aspects of the instant invention, the reflected, signature-return signal may be employed per se to simply indicate target presence, range and aziumuth, or may be compared with known pre-stored signature patterns to classify the particular target encountered.

The above and other features and advantages of the present invention will become more clear from the description hereinbelow in conjunction with specific illustrative radar systems for detecting switching, or agitated reflective targets, in which.

BASIC AGITATED TARGET DETECTION

Figure 1:
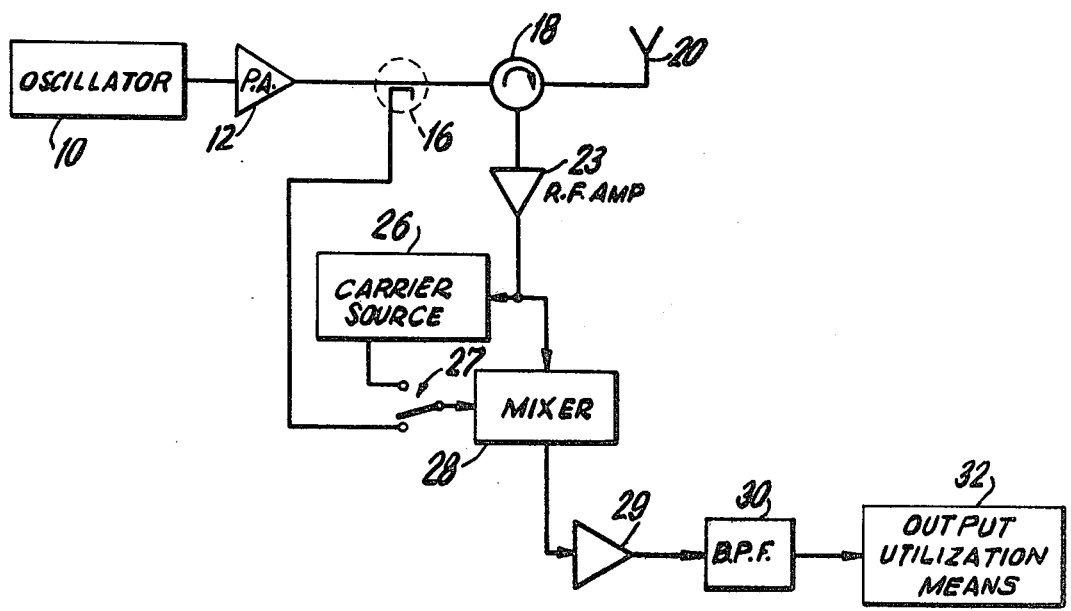
FIG. 1 is a basic block diagram of basic radar apparatus for agitated target detection.

Referring now to FIG. 1, there is shown in basic block diagram form improved, illustrative, non-cooperative radar apparatus for locating and, if desired, classifying by type an agitated, reflective target. The FIG. 1 radar is operative to yield target information whether the target is stationary or moving, requiring only that the target include a plurality of components which are vibrating or agitated, i.e., have an array of parts which are undergoing relative translation. The device is operative utilizing the principle that such a vibrating or agitated target will generate a substantially band limited return signal which is displaced in frequency from the radiated search wave by a predetermined, and relatively small, substantially fixed amount.

A frequency band beginning at a frequency slightly greater than the emitted frequency (relative frequency zero after homodyne detection) and ranging up to several (2–5)Khz has been found to be effective for the detection of an agitated target—even at frequencies in the X band range. Moreover, it has been determined further that the particular distribution of energy in this $0 \leq f \leq 2-5$Khz (relative to the transmitted wave) differs with differing kinds of targets. Thus, a positive reflected energy return in this spectrum may be examined, and comprises a form of "signature" which may be employed to identify the type of target. Accordingly, as more fully described below, the return signal may be compared with stored forms of signature distributions for varying kinds of targets to characterize the particular target encountered.

With the above principles in mind, and returning to FIG. 1, there is shown specific illustrative apparatus for effecting the above described improved radar functioning, i.e, for fully determining the incidence and type of such an agitated or vibrating target. The arrangement includes an oscillator 10 which supplies a transmitted search beam sinusoid on either a continuous wave or pulse basis acting through a power amplifier 12, a directional coupler 16, a circulator 18 and antenna 20.

Return signals produced responsive to the transmitted wave are received in the antenna 20, and pass via the circulator 16 and a radio frequency amplifier 22 to a mixer 28. In the presentation in conjunction with FIG. 1, the use of a single antenna 20 employed for both the transmit and receive functions in conjunction with a circulator 18 or a transmit-receive switch is disclosed. It will be appreciated by those skilled in the art that any form of integrated or separate transmit-receive radar apparatus might as well have been employed.

As above described, the determination of an agitated target is made by examining a band of energy very close in frequency to the emitted wave, but separated therefrom to reject all background clutter and simple "skin" reflections for inert reflective bodies. To this end, and recognizing the widely disparate frequency value of a typical X band transmission vis-a-vis the 0–2 kHz band desired for isolation, the mixer 28 is employed in a homodyne mode of reception, i.e., where the return, reflected signal is mixed or beat with a signal which provides a very accurate direct measure of the radiated wave frequency (typically equal thereto). As shown in FIG. 1, this may be effected by employing a directional coupler 16 to identically provide a portion of the radiated wave to the mixer 28. Alternatively, circuitry 26 can be used to regenerate the carrier from the receive signal in any manner well known to those skilled in the art, e.g., by employing a narrow band phase locked loop or discriminator to regenerate the radiated carrier. While a transfer switch 27 is schematically shown in FIG. 1 to select between mixing oscillations, typically radar apparatus will employ only one source of the radiated wave for homodyne detection, e.g., a portion of the outgoing wave as via a directional coupler 16 or other tap, or the circuitry 26.

The output of the mixer 28, which is base band in the case of a beat signal equal in frequency to the emitted carrier wave is amplified in an amplifier 29 and supplied to a band pass filter 30, it obviously being possible to combine the functions of the amplifier 29 and filter 30. The pass band of the filter 30 is adapted to yield the band limited frequency range of interest for switched or agitated target detection, for example, the range somewhat greater than the radiated wave (zero relative frequency) to about 2Khz above the radiated wave as above discussed. Finally, the output of the band pass filter is supplied to a form of output utilization means 32.

In its simplest form, the output utilization means may simply comprise a threshold circuit for providing an output, target indicating signal when the gross energy content of the band limited frequency range of interest supplied exceeds a minimum threshold level, signalling that an agitated target of some form has been encountered. This positive energy return may then be used in any manner well known to those skilled in the radar art. Thus, for example, target location may be achieved by measuring the delay period between a radiated search pulse and a positive return signal detected by the output utilization means 32 and the azimuth between the radar apparatus and target corresponding to the radial direction of the emitted wave which produced the return. Again, as well known to those skilled in the art, such azimuth information may be signalled by the angular position of the antenna 20 during the target-producing cycle in the case of a rotating antenna, or effective angular position in the case of scanning by a phased array. See also Lockheed Electronics Co. U.S. Pat. No. 3,900,846 for more accurately determining azimuth by examining repeated returns for a rotating antenna.

TARGET CLASSIFICATION

Figure 2:
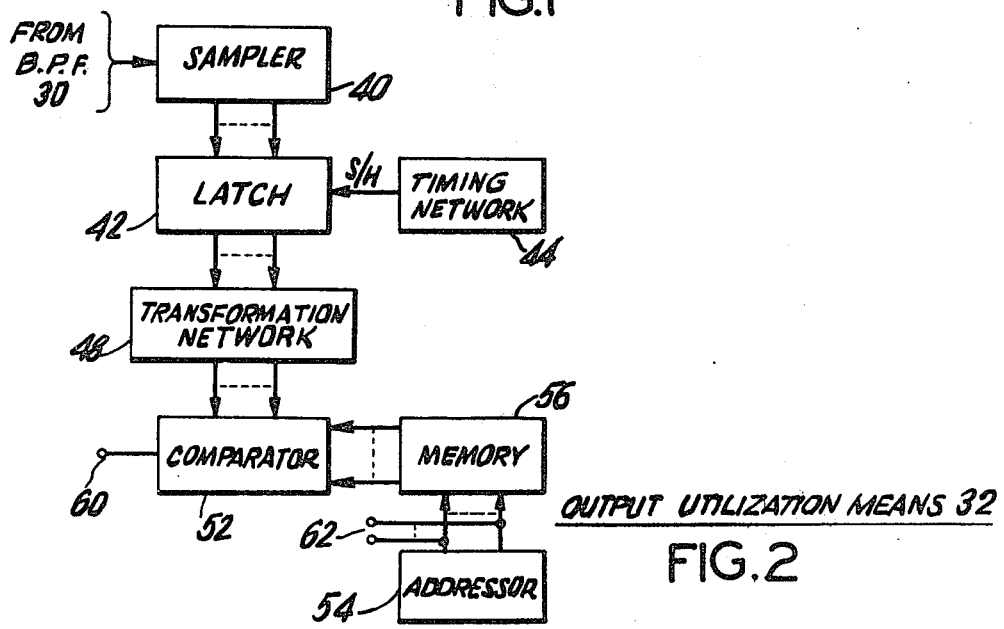
FIG. 2 is a specific illustrative form of output utilization means 32 of FIG. 1 for classifying positive target returns from vibrating, reflective, multi-component targets.

Turning now to FIG. 2, there is shown structure for determining the type of target encountered in the manner above described, viz., by examining the particular form and energy distribution content of the return signal. To this end, the return wave is supplied to a sampling circuit 40 which quantizes the incoming signal into binary form, providing a plural digit representation of the received reflecting target return to a store, or latch 42 under control of a timing network 44. At this point, then, the output of the latch presents (for as long as is required) a binary representation of the return signal. This signal representation may simply be compared with an array of stored representations of known types of target signatures or patterns. If a substantial match is determined between the instant return and one of the stored patterns, the type of target thus identified, i.e., corresponding to the stored signature giving rise to the match, is identified.

However, in accordance with one aspect of the instant invention, it has been found preferable to effect a transformation of the latch 42 time domain output signals for "match" determination in accordance with recognized match transforms, e.g., the per se well known Hadamard transform or the Fourier transform, to render the target type-classification process time-independent. Of course, the stored known signature patterns are also stored in like transformed form. A transformation network 48 is thus employed, and comprises linear arithmetic circuitry well known to those skilled in the art for generating at each network output $O_i$ a summation of various (or all) of the inputs $I_j$ thereto multiplied by constants. Thus, for example for the Hadamard transform, the relationship may be expressed by the matrix relationship $$[I_1, I_2, I_3, I_4] \begin{bmatrix} 1 & 1 & 1 & 1 \\ 1 & -1 & 1 & -1 \\ 1 & 1 & -1 & -1 \\ 1 & -1 & -1 & 1 \end{bmatrix} = \begin{bmatrix} O_1 \\ O_2 \\ O_3 \\ O_4 \end{bmatrix}, \text{[four point matrix]}.$$

Where the Hadamard transform is effected by the network 48, a memory 56 stores Hadamard transformed versions of known target type returns, and a comparator 52 employed to signal when a match is achieved. More specifically, an address unit 54 causes the memory 56 to sequentially read out the ensemble of transformed return signal types to the comparator 52 which receives as a fixed input from the output of the transformation network 48. When a substantial match is achieved, the comparator 52 energizes an output lead 60 signalling such an occurrence. The type of match is dependent upon the contents of the memory cell then being read out, i.e., which generated the match, and this may be derived from the addressing unit 54 (e.g., via leads 62).

Similarly, where a Fourier transformation is utilized, the network effects the arithmetic operations (assuming four points)

$$[I_1, I_2, I_3, I_4] \begin{bmatrix} 1 & 1 & 1 & 1 \\ 1 & e^{-(i\pi/2)} & e^{-i\pi} & e^{-(i3\pi/2)} \\ 1 & e^{-i\pi} & e^{-i2\pi} & e^{-i3\pi} \\ 1 & e^{-(i3\pi/2)} & e^{-i3\pi} & e^{-(i9\pi/2)} \end{bmatrix} = \begin{bmatrix} O_1 \\ O_2 \\ O_3 \\ O_4 \end{bmatrix}$$

It will be appreciated by those skilled in the art that the comparator 52 may be employed to determine a match on any basis known to those skilled in the art, i.e., on the basis of the Schwartz inequality wherein $$\frac{\Sigma^2(O_j B_j)}{\Sigma(O_j)^2 \Sigma(B_j)^2} \geq K,$$

wherein the $O_j$ and $B_j$ are inputs supplied to the comparator by the elements 48 and 56, and K is a preselected threshold level. That is, when the above computation yields a value $\geq K$, a "match" is recognized, and the target is deemed classified.

The composite arrangements of FIGS. 1 and 2 have thus been shown by the above to detect the incidence of a target having agitated metallic components or the like; to locate such a target; and, moreover, to classify the target as to type.

AGITATED TARGET DETECTION WHERE RELATIVE TRANSLATION OBTAINS

The above described arrangement has assumed that the relative translation between the radar equipment and target was relatively small, i.e., that the Doppler frequency shift of the return signal caused by such motion is small compared with the $0 + \leq f \leq 2$ to 5 Khz band (relative to the emitted wave) such that the intelligence-bearing return signal is at the pass band of the filter 30 (FIG. 1). This condition is not satisfied, for example, for a missile (or aircraft) mounted agitated target detecting radar where—at X band, the Doppler frequency shift $f_d = 2V/\lambda$ (where V is relative velocity and $\lambda$ is the emitted wave length) approaches 20 Khz. That is, for such an on-board radar used as a missile homing guidance system, the return signal would be shifted upward by 20 Khz (assuming the missile was closing with respect to the target). Obviously, such a signal spectrum would be rejected by the filter 30 having an upper frequency passing limit of only low unit kilocycles.

Figure 3:
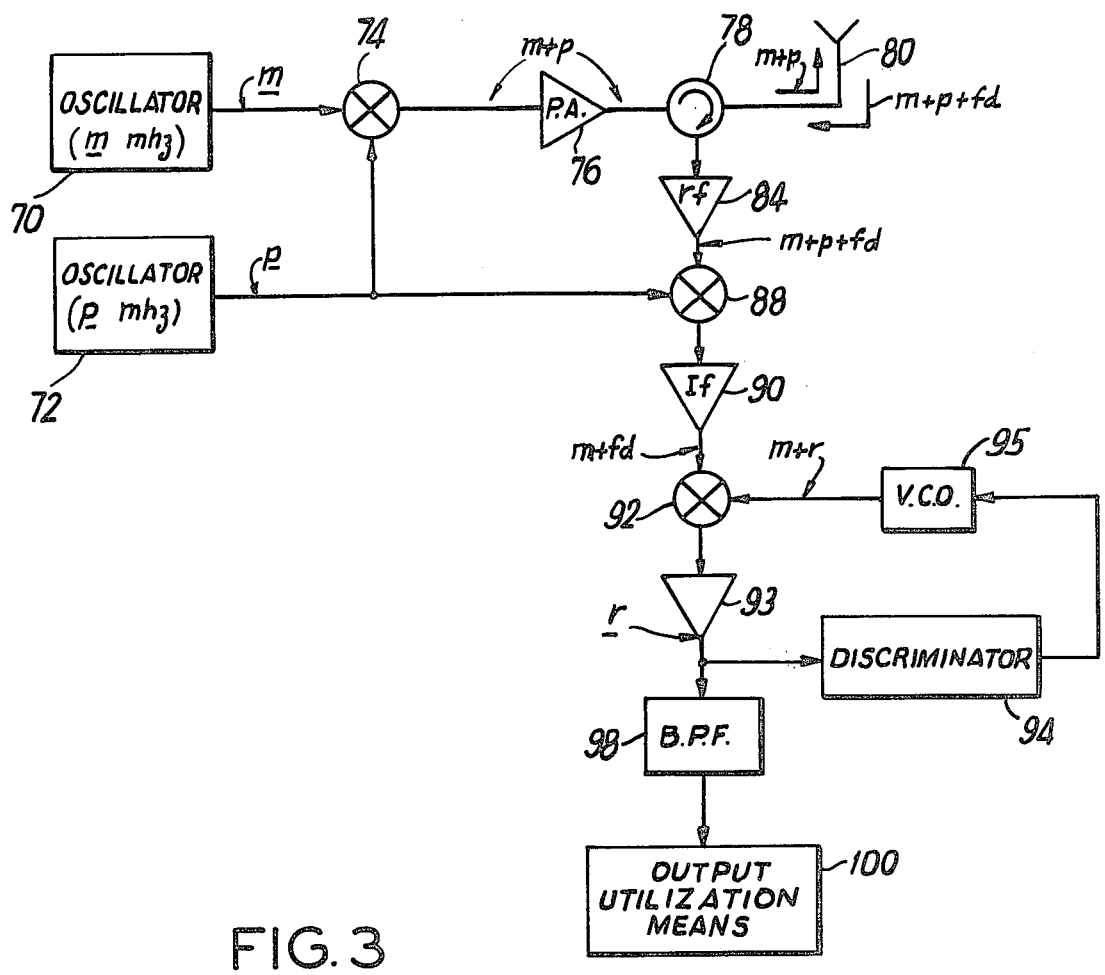
FIG. 3 is a block diagram of agitated target detecting apparatus for a relative velocity condition, in accordance with the principles of the present invention.

For this case of relative radar-target translation (or otherwise), agitated target detecting radar apparatus of the instant invention, shown in FIG. 3, comprises a principal oscillator 72 for providing the basic frequency p Mhz to be emitted, e.g., an X-band frequency. There is included a second oscillator 70 of much lower frequency m Mhz, e.g., 60 Mhz. It is to be understood that the absolute frequency values stated herein are proferred only by way of example; any reasonable frequency combinations may obviously be employed.

The frequencies m Mhz and p Mhz are added in a mixer 74 and intermediate frequency and power amplifier circuitry 76 which selects the $m + p$ Mhz sum signal from the output of the nonlinear mixer 74. This typically pulsed (or continuous) wave interrogation or scan signal of frequency $m + p$ Mhz then flows through a circulator or transmit-receive switch 78, and thence to an antenna 80 for radiation. Again, it will be understood by those skilled in the art that in place of the circulator, transmit-receive switch, or the like 78, separate transmitter and receiver antennae may be employed.

Assuming that the radar equipment is on board a missile or the like, and that an agitated target (tank, other vehicle, artillery piece or the like) is encountered by the radiated beam, a return, reflected signal will be received at the antenna 80. That target-reflected signal will have a principal frequency $m + p + f_d$, where $f_d$ is the Doppler frequency shift value. The return signal may be amplified at a radio frequency amplifier 84.

Figure 4:
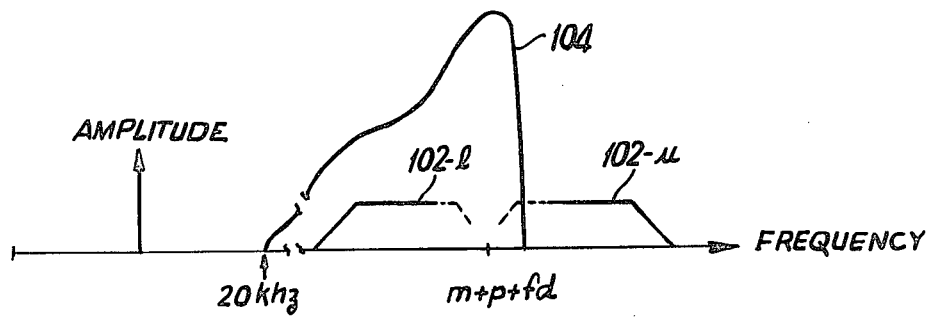
FIG. 4 depicts the signal spectrum at the output of an intermediate frequency amplifier 90 in the FIG. 3 arrangement.

The nature of the return signal is shown in FIG. 4, and comprises in principal part a component given by the envelope 104, which simply comprises the Doppler shifted surface ("skin") reflections from all objects, whether potential targets or simply background, which the emitted search wave encounters. Because the missile (or airplane) travels so much more rapidly than any ground based target, stationary and ground-moving objects will more or less create the same Doppler band since far and away the principal contribution to the relative closing velocity between the radar antenna and the encountered objects is the speed of the missile itself. Moreover, it is noted that the upper frequency, or right edge of the Doppler envelope 104 is steep and well defined since this represents the maximum, on-axis return signal where the relative velocity between the antenna and background/target is maximum. The (for present purposes) Doppler, noise envelope 104 decreases relatively gradually to the left (lower frequency) which represents the ensemble of off-axis returns where in essence there is a quantitative cosine function modifier for the Doppler frequency shift relationship.

It is also observed from FIG. 4 that the intelligence bearing signal of interest in the relative velocity case consists of two frequency bands symmetrically disposed about the Doppler shifted wave frequency $m + p + f_d$ Mhz by the above noted $0 +$ to 2-to-5 Khz. That is, the agitated target indicating frequency shifted information is contained in symmetrical upper 102-u and lower 102-l information bands each slightly displaced from the Doppler shifted carrier. The lower agitated target information signalling band 102-l is essentially unrecoverable as comprising a signal masked by the Doppler skin return 104. Thus, in accordance with the instant invention, the incidence of an agitated target in the relative motion case is detected by operating on the upper frequency band 102-u in the manner below described. This signal 102-u exceeds (and therefore is not masked by) the well defined on-axis Doppler surface return.

A difficulty in detecting the several Khz wide band 102-u is that it occurs in a variable frequency position dependent upon the speed of the carrying vehicle which, in turn determines the value $f_d$ at any instant. Circuitry in FIG. 3 is therefore employed to shift the band 102-u, wherever it occurs, to the precise pass band of a filter 98 which has a fixed pass band several Khz wide. Thus, after the intelligence bearing signal 102-u of FIG. 4 is shifted to and passes through the band pass filter 98, it is operated upon by output utilization means 100 which may comprise any such means discussed hereinabove with respect to the element 32 of FIG. 1, or the organization of FIG. 2 for target classification purposes.

It thus remains to discuss the particular manner in which the signal 102-u of variable frequency occurrence is shifted to the fixed pass band of the narrow band pass filter 98. Let the band pass filter 98 be characterized by a pass band of r $Mhz + 0 + Khz \leq f \leq r$ $Mhz + 2$ to 5 Khz. Again, for purposes of illustration only, let r be one megacycle such that the band pass filter 98 passes signals in the approximate band 1,000,500 Hz–1,005,000 Hz.

The target return signal (generalized frequency about $m + p + f_d$ Mhz) from the radiated frequency amplifier 84 is combined with the original p Mhz output of oscillator 72 in a mixer 88, and a following intermediate frequency amplifier 90 adjusted to select the difference frequency about $m + f_d$ Mhz at its output. Again with respect to the assumed numerical situation, the signal band at the output of the intermediate frequency amplifier 90 will thus be centered about 60,020,000 Hz (it will be recalled that m was 60 Mhz and the Doppler shift $f_d$ about 20 Khz). This approximately 60 Mhz signal must then be shifted down to the about 4 Khz pass band of the filter 98 disposed near 1 Mhz. Moreover, this must be done in a manner such that the upper frequency spectrum 102-u will correspond to the pass band of the filter 98 irrespective of the Doppler shift being anything from zero to something exceeding that corresponding to the maximum missile velocity.

To this end, a mixer 92 and intermediate frequency amplifier 93 are utilized to down-shift the 60 Mhz signal to the 1 Mhz range under control of the output sinusoid from a voltage controlled oscillator 95. The controlled oscillator 95, in turn, is controlled by a voltage supplied by a discriminator 94 which senses the output of the intermediate frequency amplifier 93. The elements 92, 93, 94 and 95 perform per se as a well known automatic frequency control (AFC) feed back loop to assure that the principal signal component at the output of the amplifier 93 (the down-converted peak of the Doppler wave 104 at a frequency m+p+$f_d$ Mhz) occurs at r Mhz; for the assumed case, at 1 Mhz. Thus, the discriminator 94 quiescently supplies the voltage controlled oscillator 95 with a control voltage such that the vco provides an output frequency of 59 Mhz, thereby placing the first order difference signal of the incoming m+p+$f_d$ Mhz signal at r Mhz as required, the difference between 59 and 60 Mhz being 1 Mhz. If the output frequency of the intermediate frequency amplifier 93 attempts to depart from the prescribed 1 Mhz value, the discriminator 94 changes the control potential supplied to voltage controlled oscillator 95 in a direction such that the output frequency of element 95 changes in a direction to restore the 1 Mhz nominal output of the wave 104 peak in the well understood AFC manner.

Accordingly, no matter what the value of the frequency shift $f_d$, the wave of FIG. 4 will be translated downward in frequency such that the desired detectable agitated target intelligence 102-u precisely corresponds to the pass band of filter 98 for target detection in the manner above considered.

The above described arrangement is merely illustrative of the principles of the present invention. Numerous modifications and adaptations thereof will be readily apparent to those skilled in the art without departing from the spirit and scope of the present invention.

I claim:

1. In combination in radar apparatus for detecting an agitated, reflective target comprising means for radiating an interrogation wave of radio frequency energy, means for receiving a reflected energy signal ensemble, said reflected signal ensemble including signal components at the radiated wave frequency, a Doppler frequency-shifted frequency which depends upon relative translation between such radar apparatus and the target, and an agitated target signifying signal adjacent in frequency to said Doppler shifted component but remote in frequency from said radiated wave frequency, mixing means for mixing said reflected signal with a local oscillation, band pass filter means connected to said mixing means for extracting from the output of said mixing means a band limited portion of said reflected signal in a fixed, predetermined frequency band, and automatic frequency control means having a frequency sensing input connected to the output of said mixing means for supplying to said mixing means a local oscillation of variable frequency value for shifting said agitated target signaling component of said reflected signal to said fixed, predetermined frequency band independent of the obtaining Doppler frequency shift, and means connected to said band pass filter means to determine the incidence of a detected target from the output of said band pass filter.

2. A combination as in claim 1 wherein said automatic frequency control means includes a controlled oscillator and frequency responsive means connected to the output of said mixing means for controlling said controlled oscillator.

3. A combination as in claim 2 wherein said frequency responsive means is a discriminator.

4. A combination as in claim 1 wherein said radiating means includes first and second frequency sources and means for generating the algebraic sum of said frequencies, further comprising additional mixing means for mixing said received, reflected energy signal with the output of one of said first and second frequency sources.

5. A combination as in claim 1, further comprising output utilizing means connected to the output of said band pass filter means.

6. A combination as in claim 5, wherein said output utilization means includes means for classifying by type the agitated target giving rise to said return signal.

7. A combination as in claim 6, wherein said target classifying means includes means for storing at least one signal each representative of a predetermined target type, and comparator means for comparing said band pass filter extracted band limited signal with said stored target-type signal patterns.

8. A combination as in claim 7 wherein said classifying means further comprising means for sampling said extracted band limited signal.

9. The method for detecting an agitated, reflective target employing radar apparatus disposed on a relatively rapidly moving vehicle comprising the steps of radiating an interrogation wave of radio frequency energy, receiving a reflected energy signal ensemble, said relected signal ensemble including a Doppler-shifted surface reflection signal portion and a detectable agitated target signal portion greater in frequency than said Doppler-shifted surface reflection signal portion, and mixing said received reflected signal ensemble with a local oscillation of controlled frequency to shift the frequency of said agitated target received signal portion to the fixed, predetermined frequency pass band of a band pass filter irrespective of the Doppler translation of said signal portion, said method further including the steps of automatically supplying a mixing local oscillation of a frequency substantially given by the difference between the frequency band of said band pass filter and said signal portion irrespective of the Doppler frequency shift of said signal portion.

10. A method as in claim 9 further comprising the step of classifying by target type the signal output of the band pass filter.

11. A method for detecting a non-cooperative agitated target from a moving vehicle including the steps of emitting an interrogation wave from the vehicle, receiving a return signal comprising the reflection of said emitted wave from the target, said return signal comprising components at the frequency of the interrogation wave, a Doppler component at a frequency Doppler-shifted from the frequency of the emitted interrogation wave by an amount depending upon the relative translation between the vehicle and target, and an agitated target identifying component in a variable frequency band remote from the frequency of the emitted wave and the Doppler component dependent upon the relative translation between the vehicle and target, heterodyne mixing said return signal employing the output of a variable frequency oscillation to shift the frequency of said agitated target identifying signal to a fixed frequency band, and passing the output of said mixing step through a band pass filter adapted to pass said fixed frequency band to isolate said frequency shifted agitated target identifying signal.

12. A method for detecting a non-cooperative substantially stationary agitated target from a moving vehicle including the steps of emitting an interrogation wave from the vehicle, receiving a return signal comprising the reflection of said emitted wave reflected from the target, said return signal comprising components at the frequency of the interrogation wave, a Doppler component at a frequency Doppler-shifted from the frequency of the emitted interrogation wave by an amount depending upon the relative translation between the vehicle and target, and an agitated substantially stationary target identifying component in a variable frequency band remote from the frequency of the emitted wave and the Doppler component dependent upon the relative translation between the vehicle and target, hetrodyne mixing said return signal employing the output of a variable frequency oscillator to shift the frequency of said agitated target identifying signal to a fixed frequency band, and passing the output of said mixing step through a band pass filter to isolate said frequency shifted target identifying signal.

13. In combination in radar apparatus for detecting a non-cooperative agitated target from a moving vehicle, interrogation wave emitting means, target reflected return signal receiving means, means for afixing at least one of said emitting or receiving means to the vehicle, said return signal including at least a first component at the frequency of the interrogation wave emitted by said emitting means, a Doppler-shifted signal, and an agitated target signaling frequency band component in a variable frequency spectrum near said Doppler-shifted signal, and means connected to said reflected signal receiving means for signaling the incidence of an agitated target, said target signaling means including automatic hetrodyne means for shifting said agitated target signaling band component of said return signal to a fixed frequency spectrum, and band pass filter means connected to said hetrodyne means for passing said fixed frequency spectrum, thereby providing an agitated target indicating signal.

14. A combination as in claim 13, wherein said automatic hetrodyne means comprises a variable frequency oscillator, a mixer, and frequency locked loop means connected to and responsive to the output of said mixer for controlling said variable frequency oscillator.

* * * * *